United States Patent
Brewer et al.

(10) Patent No.: US 9,440,738 B2
(45) Date of Patent: Sep. 13, 2016

(54) DRY LUBRICATED ROTARY ACTUATOR FOR IN BLADE ROTOR CONTROL

(71) Applicant: Claverham Limited

(72) Inventors: Paul R. Brewer, Bristol (GB); Suat Bekircan, Bath (GB); Reg R. Raval, North Somerset (GB)

(73) Assignee: CLAVERHAM LTD., Bristol (GB)

( * ) Notice: Subject to any disclaimer, the term of this patent is extended or adjusted under 35 U.S.C. 154(b) by 573 days.

(21) Appl. No.: 13/895,080

(22) Filed: May 15, 2013

(65) Prior Publication Data

US 2014/0083216 A1 Mar. 27, 2014

(30) Foreign Application Priority Data

Jun. 13, 2012 (EP) .................................... 12171792

(51) Int. Cl.
*B64C 27/615* (2006.01)
*F16H 21/40* (2006.01)
*B64C 27/72* (2006.01)

(52) U.S. Cl.
CPC ............. *B64C 27/615* (2013.01); *F16H 21/40* (2013.01); *B64C 2027/7266* (2013.01); *Y02T 50/34* (2013.01); *Y10T 74/18056* (2015.01)

(58) Field of Classification Search
CPC .................................................. B64C 27/615
See application file for complete search history.

(56) References Cited

U.S. PATENT DOCUMENTS

| | | | |
|---|---|---|---|
| 3,829,239 A | | 8/1974 | Rybicki et al. |
| 5,626,312 A | * | 5/1997 | Head .................... B64C 27/615 244/17.25 |
| 6,508,439 B1 | | 1/2003 | Fink et al. |
| 6,827,310 B1 | * | 12/2004 | Whitham ................. B64C 9/02 244/3.24 |
| 2008/0101931 A1 | * | 5/2008 | Chaudhry ............ B64C 27/615 416/131 |

FOREIGN PATENT DOCUMENTS

| | | |
|---|---|---|
| CN | 2667233 Y | 12/2004 |
| DE | 19938609 A1 | 3/2001 |
| EP | 0371213 A1 | 6/1990 |
| GB | 2299562 A | 10/1996 |
| JP | 2006010008 | 1/2006 |
| WO | 2011070621 A1 | 6/2011 |

* cited by examiner

*Primary Examiner* — Richard Edgar
(74) *Attorney, Agent, or Firm* — Cantor Colburn LLP

(57) ABSTRACT

A rotor blade assembly includes a rotor blade, a rotatable flap portion disposed along a span of the rotor blade. A rotary actuator is located inside the rotor blade and is operably connected to the flap portion to rotate the flap portion about a flap axis. A rotary-winged aircraft includes an airframe and a main rotor assembly operably connected to the airframe. The main rotor assembly includes a plurality of rotor blade assemblies rotatable about a rotor assembly axis. At least one rotor blade assembly of the plurality of rotor blade assemblies includes a rotor blade and a rotatable flap portion disposed along a span of the rotor blade. A rotary actuator located inside the rotor blade and is operably connected to the flap portion to rotate the flap portion about a flap axis. The rotary actuator is absent oil, grease or other fluid lubricant.

12 Claims, 3 Drawing Sheets

DRY LUBRICATED ROTARY ACTUATOR FOR IN BLADE ROTOR CONTROL

CROSS REFERENCE TO RELATED APPLICATIONS

This application claims priority to European Patent Application No. 12171792.0 filed Jun. 13, 2012, the entire contents of which is incorporated herein by reference.

BACKGROUND OF THE INVENTION

The subject matter disclosed herein relates to rotary-winged aircraft. More specifically, the subject matter disclosed herein relates to actuation of control surfaces of rotary-winged aircraft rotor blades.

Rotary-winged aircraft, such as helicopters, often utilize movable surfaces such as flaps on the blades of the main rotor of the helicopter. Movement of these flaps, such as rotation of the flaps about an axis, improves performance of the rotor in certain flight conditions. Typically, the flaps are moved via linear actuators either directly connected to the flap (chordwise) or operating through a bell crank mechanism (spanwise). The linear actuators are most often constructed using ball screws or roller screws driven by brushless DC motors. To convert the linear motion of the actuator into the desired rotary motion of the flap, it is necessary to connect the actuator to the flap via mechanical linkages and/or bell cranks. These additional components are costly and increase system weight. Further, due to the rotating nature of the rotor blade, the linkages and bell cranks are subject to high centrifugal forces. To offset these forces, the addition of balance masses is necessary to equalize the centrifugal forces during operation, further adding weight to the system.

Further, the linear actuator components such as motor bearings, rollerscrew, and sliding parts such as the output shaft are lubricated by oil or grease contained in the actuator. Such lubricants are affected by high centrifugal forces and tend to migrate to a radially outboard end of the actuator, leaving portions of the actuator without adequate lubrication. Grease and oil are also affected by operating temperature, with low temperatures causing the grease to thicken, resulting in sluggish operation. Also, in a linear actuator the internal volume of the actuator changes during operation, so a complete oil fill of the actuator is not a practical solution, and the oil fill may be subject to leakage during operation.

BRIEF DESCRIPTION OF THE INVENTION

In one embodiment, a rotor blade assembly includes a rotor blade, a rotatable flap portion disposed along a span of the rotor blade. A rotary actuator is located inside the rotor blade and is operably connected to the flap portion to rotate the flap portion about a flap axis. The rotary actuator is absent oil, grease or other fluid lubricant.

In another embodiment, a rotary-winged aircraft includes an airframe and a main rotor assembly operably connected to the airframe. The main rotor assembly includes a plurality of rotor blade assemblies rotatable about a rotor assembly axis. At least one rotor blade assembly of the plurality of rotor blade assemblies includes a rotor blade and a rotatable flap portion disposed along a span of the rotor blade. A rotary actuator located inside the rotor blade and is operably connected to the flap portion to rotate the flap portion about a flap axis. The rotary actuator is absent oil, grease or other fluid lubricant.

In yet another embodiment, an actuation system for a flap portion of a rotor blade includes a rotary actuator located inside the rotor blade and operably connected to the flap portion to rotate the flap portion about a flap axis. The rotary actuator is absent oil, grease or other fluid lubricant.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
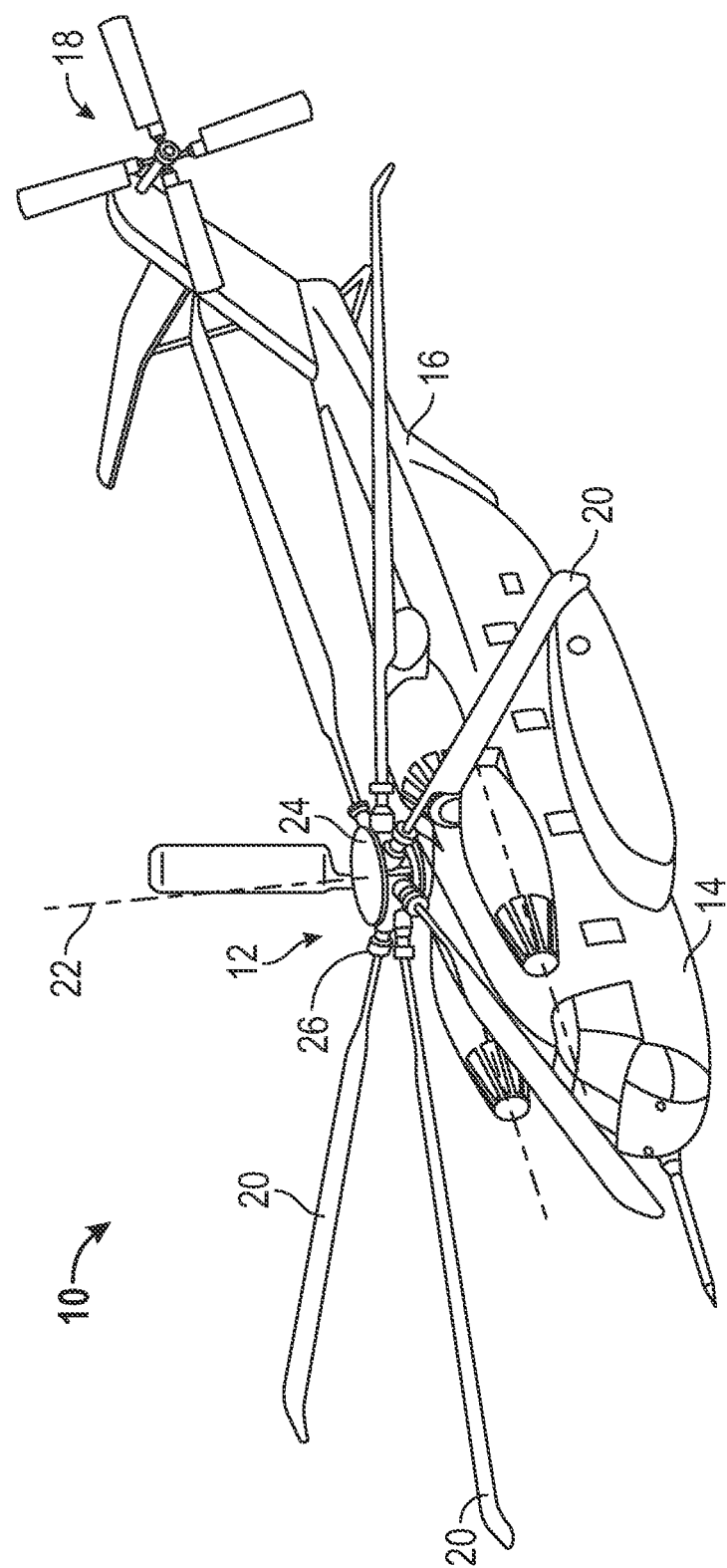
FIG. 1 is a schematic illustration of an embodiment of a rotary-winged aircraft.

Shown in FIG. 1 is a schematic of a rotary wing aircraft, in this embodiment, a helicopter 10. The helicopter 10 includes a main rotor assembly 12, and an airframe 14 having an extending tail 16 at which is mounted an anti-torque rotor 18. Although the aircraft illustrated is a helicopter 10, it is to be appreciated that other machines, such as turbo props or tilt-rotor aircraft or coaxial or tandem rotor helicopters, and wind turbines may also benefit from the system of the present disclosure. The main rotor assembly 12 includes a plurality of rotor blades 20 located about a rotor axis 22 via a rotor hub assembly 24.

Figure 2:
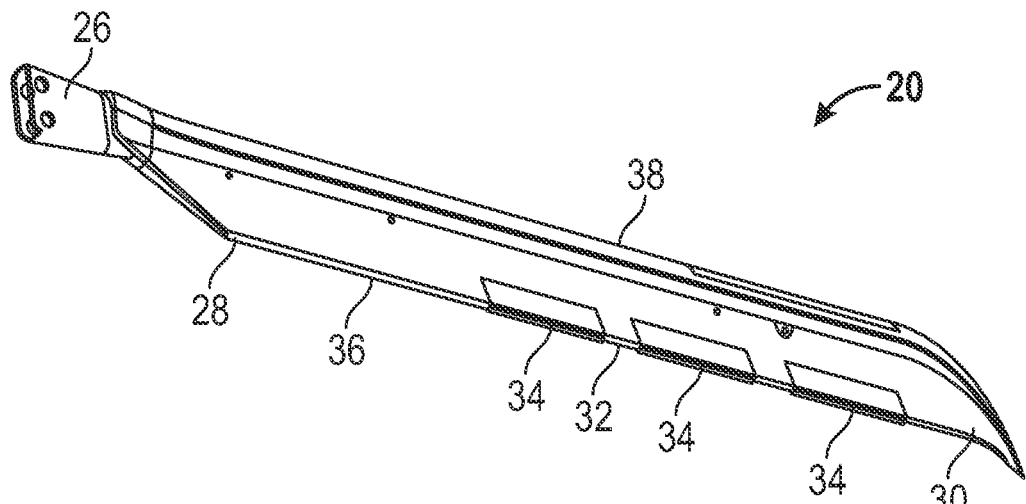
FIG. 2 is a schematic illustration of an embodiment of a rotor blade assembly for a rotary-winged aircraft.

Referring now to FIG. 2, each rotor blade 20 extends from a blade cuff 26, at which the rotor blade 20 is secured to the hub assembly 24 (best shown in FIG. 1). The rotor blade 20 includes a root section 28 nearest the blade cuff 26 and a tip section 30 at a most radially outboard portion of the rotor blade 20. A midspan section 32 is located between the root section 28 and the tip section 30. Each rotor blade 20 section may be further defined by particular airfoil shapes or geometries to result in desired aerodynamic properties and performance of each section, and the rotor blade 20 as a whole. The rotor blade 20 includes one or more flaps 34 located at a trailing edge 36 of the rotor blade 20 in one or more of the root section 28, tip section 30 or midspan section 32. Even though flaps 34 located at the trailing edge 36 are described and illustrated herein, it is to be appreciated that rotor blades 20 including flaps 34 located at a leading edge 38 of the rotor blade 20 would also benefit from the present disclosure.

Figure 3:
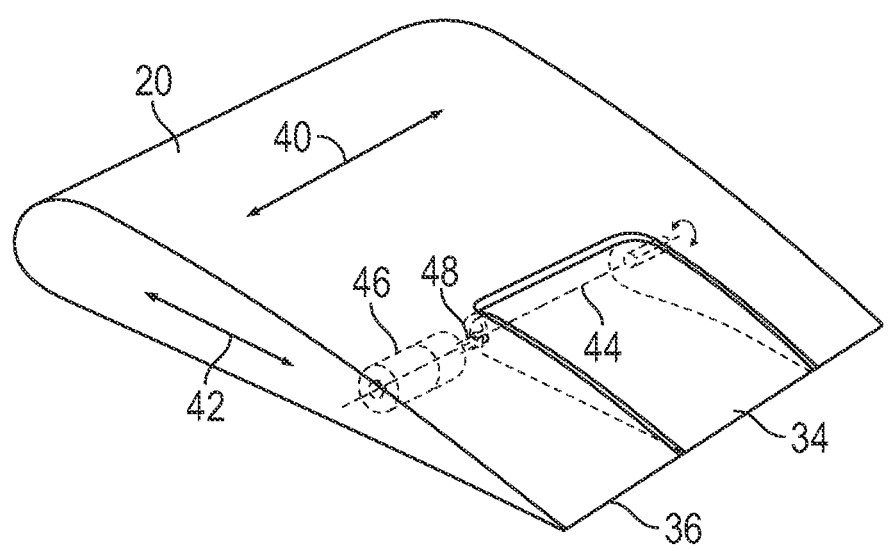
FIG. 3 is a schematic illustration of an embodiment of a flap and actuator arrangement of rotor blade assembly for a rotary-winged aircraft.
Figure 4:
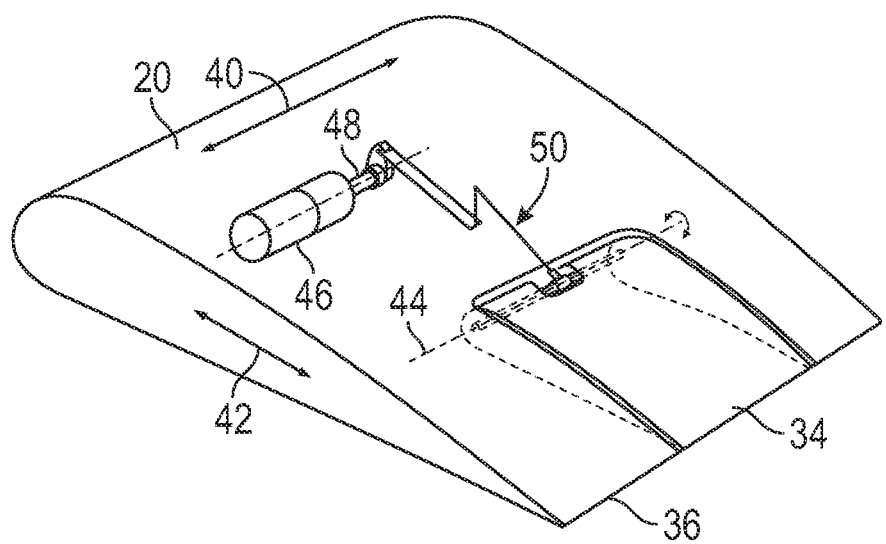
FIG. 4 is a schematic illustration of another embodiment of a flap and actuator arrangement of a rotor blade assembly for a rotary-winged aircraft.

In FIG. 3, an embodiment of a flap 34 located at the trailing edge 36 is illustrated. The flap 34 extends at least partially along the trailing edge in a spanwise direction 40, and partially into the rotor blade 20 along a chordwise direction 42. The flap 34 is rotated about a flap axis 44, substantially parallel to the spanwise direction 40, to change aerodynamic properties and performance of the rotor blade 20. A rotary actuator 46 is connected to the flap 34 along the flap axis 44 to drive rotation of the flap 34. In some embodiments, as shown in FIG. 3, the rotary actuator 46 is directly connected to the flap 34 via an output shaft 48 of the rotary actuator 46 extending along the flap axis 44. In other embodiments, as shown in FIG. 4, the rotary actuator 46 is connected to the flap 34 via a linkage 50 extending between the output shaft 48 and the flap 34. This configuration is especially useful with rotor blades 20 where a blade cross-sectional shape is too small at the flap axis 44 to accommodate the rotary actuator 46. Use of the rotary actuator 46 allows for high frequency, precise movement of the flap 34, in some embodiments in the range of, for example, about 1-5 cycles per single rotation of the main rotor assembly 12.

Figure 5:
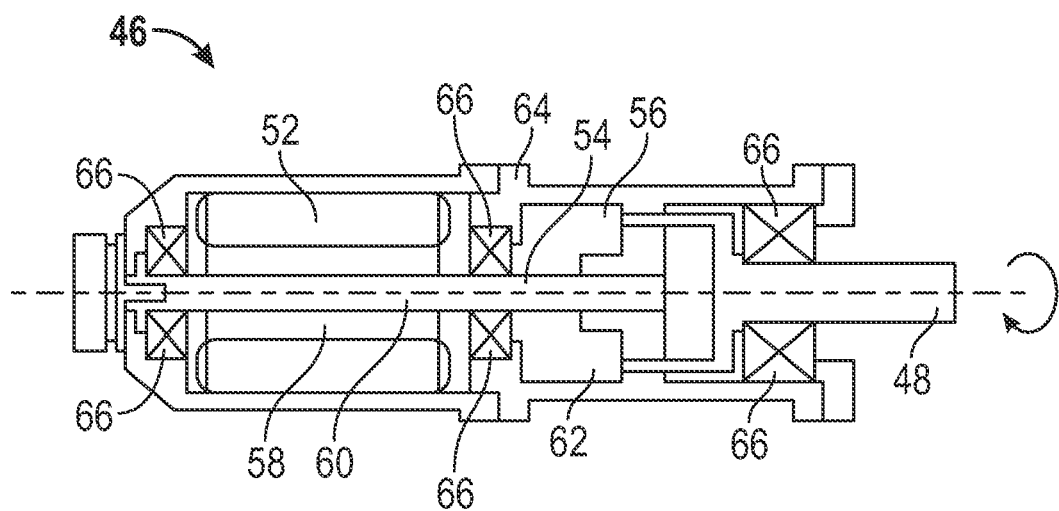
FIG. 5 is a cross-sectional view of an embodiment of an actuator for a flap of a rotor blade assembly for a rotary-winged aircraft The detailed description explains embodiments of the invention, together with advantages and features, by way of example with reference to the drawing.

Referring to FIG. 5, the rotary actuator 46 includes a high power density DC brushless motor 52 that drives rotation of a motor shaft 54. In some embodiments, the motor 52 utilizes neodymium magnets 58 in a rotor 60 to allow high continuous and peak torque ratings, and high reliability in harsh operating environments. The motor shaft 54 is connected to a high reduction transmission gearbox 56 to translate the high rotational speed of the motor shaft 54 into a usable lower rotational speed of the output shaft 48. In some embodiments, the gear box includes a epicyclic or harmonic type gear set 62, which are located in a common actuator housing 64 with the motor 52 to reduce weight and space requirements. Use of the harmonic gear set 62 enables gear ratios of up to, for example, 300:1 to be achieved. Further, the harmonic gear set 62 has high torque capacity, compact size, low weight, high torsional stiffness and reduced or zero backlash compared to other gear set types.

Due to its configuration, the rotary actuator 46 has a constant internal volume and balance weights are not necessary since a center of mass of the rotary actuator 46 is also constant. Further, the use of the rotary actuator 46 can reduce weight and complexity of the rotor blade 20 by elimination of the linkage necessary in the prior act linear actuation systems. Also, the rotary actuator maintains a constant internal volume so that a correct amount of lubricant may be more easily applied therein.

Further, in some embodiments, the rotary actuator 46 is constructed such that oil or grease lubricants may be omitted. The moving and sliding components of the rotary actuator 46, such as bearings 66, motor shaft 54 and/or output shaft 48 may be self lubricating, provided with dry lubrication surface finishes or coatings, or formed from materials such as ceramics, or formed with diamond like coating (DLC) technology, in some embodiments in conjunction with dry lubricant coating or grease plating processes. Alternatively, the rotary actuator may be lubricated with nanoparticle based lubricants, fine-grained dry materials that are prevented from migration from critical areas under high centrifugal loading by suitable baffles and/or separators. In other embodiments, the internal ball bearings are constructed using ceramic or steel balls and solid lubricant ball separators.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The following clauses set out features of the invention which may not presently be claimed in this application but which may form the basis for future amendment or a divisional application.

The invention claimed is:

1. A rotor blade assembly comprising:
   a rotor blade;
   a rotatable flap portion disposed along a span of the rotor blade; and
   a rotary actuator disposed inside the rotor blade operably connected to the flap portion to rotate the flap portion about a flap axis, the rotary actuator absent oil, grease or other fluid lubricant, the rotary actuator including:
   a direct current brushless motor: and
   a transmission gearbox including a epicyclic or harmonic gear set operably connected to the direct current brushless motor to translate the rotational speed of the motor into a lower rotational speed usable by an actuator output shaft which operably connects the rotary actuator to the rotatable flap portion.

2. The rotor blade assembly of claim 1, wherein the rotary actuator is disposed along the flap axis and directly connected to the flap via the actuator output shaft, the actuator output shaft extending along the flap axis.

3. The rotor blade assembly of claim 1, wherein the flap portion is disposed at a trailing edge of the rotor blade assembly.

4. The rotor blade assembly of claim 1, wherein the rotary actuator is lubricated via one or more of dry lubrication surface finishes or coatings or nanoparticle based lubricants.

5. A rotary-winged aircraft comprising:
   an airframe; and
   a main rotor assembly operably connected to the airframe including a plurality of rotor blade assemblies rotatable about a rotor assembly axis, at least one rotor blade assembly of the plurality of rotor blade assemblies including:
   a rotor blade;
   a rotatable flap portion disposed along a span of the rotor blade; and
   a rotary actuator disposed inside the rotor blade operably connected to the flap portion to rotate the flap portion about a flap axis, the rotary actuator absent grease, oil or other fluid lubricant, the rotary actuator including:
   a direct current brushless motor; and
   a transmission gearbox including a epicyclic or harmonic gear set operably connected to the direct current brushless motor to translate the rotational speed of the motor into a lower rotational speed usable by an actuator output shaft which operably connects the rotary actuator to the rotatable flap portion.

6. The rotary-winged aircraft of claim 5, wherein the rotary actuator is disposed along the flap axis and directly connected to the flap via the actuator output shaft, the actuator output shaft extending along the flap axis.

7. The rotary-winged aircraft of claim 5, wherein the flap portion is disposed at a trailing edge of the rotor blade assembly.

8. The rotary-winged aircraft of claim 5, wherein the rotary actuator cycles the flap portion about the flap axis at a rate in the range of about 1-5 cycles per revolution of the rotor blade assembly about the rotor assembly axis.

9. The rotary-winged aircraft of claim 5, wherein the rotary actuator is lubricated via one or more of dry lubrication surface finishes or coatings or nanoparticle based lubricants.

10. An actuation system for a flap portion of a rotor blade comprising a rotary actuator disposed at the rotor blade and operably connected to the flap portion to rotate the flap portion about a flap axis, the rotary actuator absent oil, grease or other fluid lubricant, the rotary actuator including:
   a direct current brushless motor: and
   a transmission gearbox including a epicyclic or harmonic gear set operably connected to the direct current brushless motor to translate the rotational speed of the motor into a lower rotational speed usable by an actuator output shaft which operably connects the rotary actuator to the flap portion.

11. The actuation system of claim 10, wherein the rotary actuator is disposed along the flap axis and directly connected to the flap portion via the actuator output shaft, the actuator output shaft extending along the flap axis.

12. The actuation system of claim 10, wherein the rotary actuator is lubricated via one or more of dry lubrication surface finishes or coatings or nanoparticle based lubricants.

* * * * *